June 23, 1936.  L. E. LA BRIE  2,044,989
BRAKE
Filed March 31, 1932
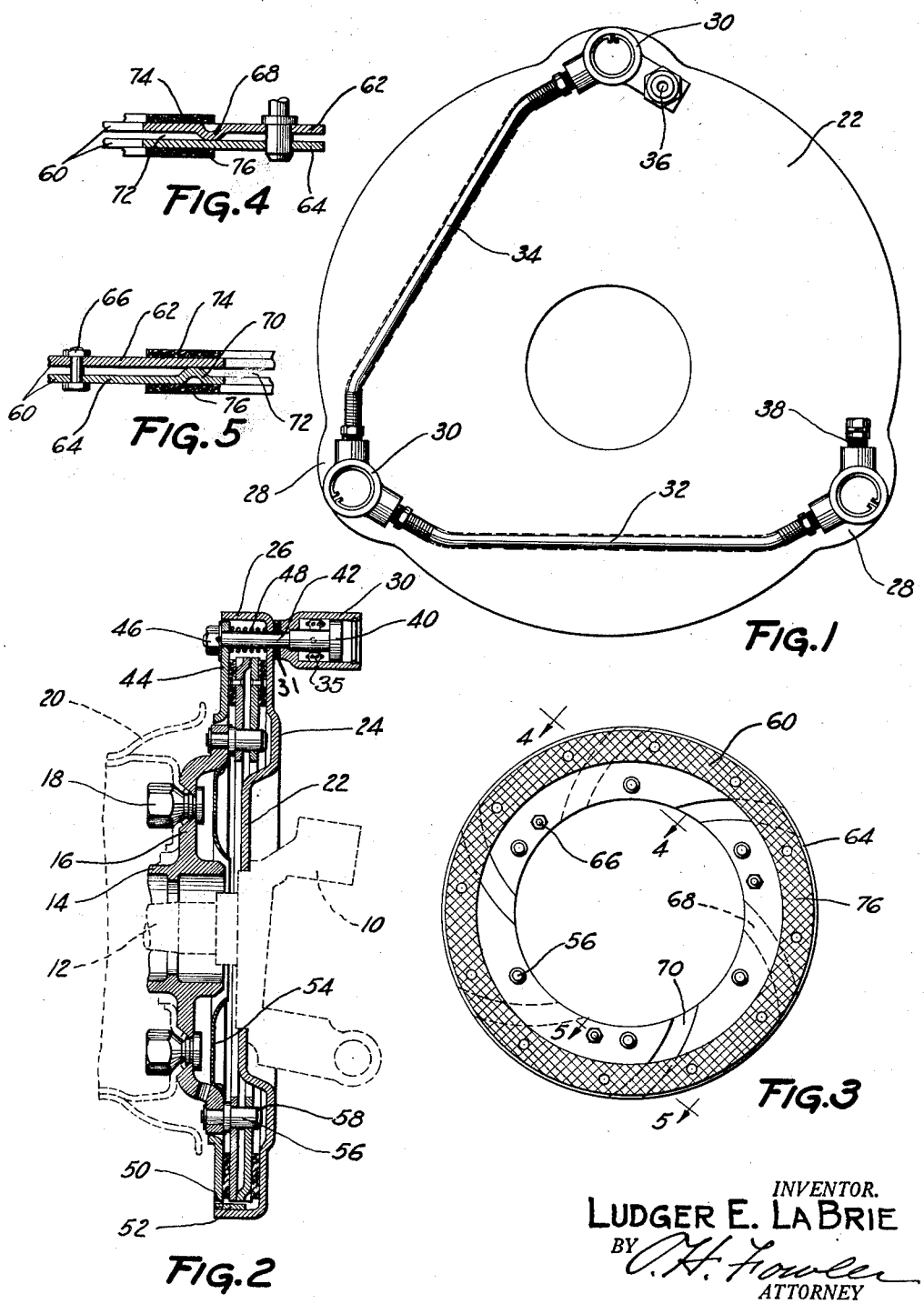
INVENTOR.
LUDGER E. LA BRIE
BY
ATTORNEY Patented June 23, 1936

2,044,989

UNITED STATES PATENT OFFICE 2,044,989

BRAKE

Ludger E. La Brie, South Bend, Ind., assignor to Bendix Aviation Corporation, South Bend, Ind., a corporation of Delaware Application March 31, 1932, Serial No. 602,309

15 Claims. (Cl. 188—72)

This invention relates to brakes and more particularly to that type known as disc brakes.

Broadly, the invention comprehends a disc brake for a wheel including a fixed element, an axially movable element, a rotatable axially movable element carried by the wheel and adapted to revolve between the fixed and axially movable elements, and means for hydraulically actuating at least two of the elements to effectively retard rotation of the wheel.

The invention includes a highly desirable brake structure, embodying means for effectively cooling the friction elements of the brake, means for supporting the friction elements when the wheel with which the brake is associated is removed, means for taking the torque in the most effective manner, and means for applying the brake to the utmost efficiency.

In the structure shown, there is no loss whatsoever due to the deflections in the hookup, because to obtain the necessary pressure at the disc, it is only necessary to make the area of the cylinders of sufficient size. Thus the line pressure may be retained within the usual working limits.

An object of the invention is to provide a disc brake of a compact character.

Another object of the invention is to provide a disc brake having an applied means including a plurality of operating cylinders arranged to uniformly distribute the applied force.

Another object of the invention is to provide a disc brake having a simple adjusting means.

A further object of the invention is to provide a disc brake having a simplified means for taking the torque of the brake including means for supporting the friction element when the wheel with which the brake is associated is removed.

Yet a further object of the invention is to provide means for effectively cooling the friction elements.

A feature of the invention is a friction element for a brake including two spaced plates having alternately arranged webs providing in effect a blower for cooling the friction element.

Other objects and features of the invention will appear from the followng description taken in connection with the drawing, which forms a part of this specification, and in which:

Figure 1 is a side elevation of a brake structure embodying the invention;

Figure 2 is a vertical sectional view;

Figure 3 is a side elevation of the friction element; and

Figures 4 and 5 are large cross sectional detail views of the friction element.

Referring to the drawing for more specific details of the invention, 10 represents a knuckle having formed intgeral therewith a spindle 12, and positioned for rotation on the spindle is a hub 14 having a flange 16 to which is secured as by bolts 18, a wheel 20.

The knuckle 10 has suitably secured thereto a disc 22 provided with an offset portion 24 and a peripheral flange 26. The disc 22 has spaced offset portions 28 on which are positioned cylinders 30 connected in series by tubes 32 and 34. The first cylinder in the series is connected by a pipe 36 to a suitable source of fluid under pressure, and the last cylinder in the series is provided with a conventional bleeder 38.

The cylinders have a head or closing means 31 at one end and have positioned therein pistons 40 forming a closing means at the other end, the pistons being provided with rods 42 extending through suitable openings in the cylinder head 31 and disc 22, and registered openings in a disc 44. The ends of the rods 42 are threaded to receive nuts 46 providing means for effectively adjusting the brake and positioned on the rods between the discs are coil springs 48 for returning the disc 44 to normal position. The disc 44 has a plurality of notches 50 adapted to receive plates 52 spot-welded or otherwise secured to the flange 26. The plates 52 effectively interlock the discs 22 and 44 and provide a very effective means for taking the torque of the brake. These plates have an additional function which will hereinafter appear.

The flange 16 on the hub 14 has suitably secured thereto a grease shield 54 and positioned on the flange is a plurality of spaced studs 56 provided with conical end portions 58. These studs are arranged immediately adjacent the portion 24 on the disc 22 so that a minimum reduction in thickness of the brake may be had.

Axially movable on the studs 56 is a friction element 60 including corresponding annular discs 62 and 64, secured together as by bolts 66. The plate 62 is provided with a plurality of webs 68 and the plate 64 is provided with alike webs 70, the webs on one plate being arranged alternately with respect to the webs on the other plate. These webs form in conjunction with the opposed faces of the annular discs 62 and 64 passages 72 which function as blowers to effectively cool the friction element. The oppositely disposed faces of the discs 62 and 64 have suitably secured thereto friction lining 74 and 76 adapted to engage the discs 22 and 44.

In operation, fluid is admitted under pressure to the cylinders 30 through ports 35 whereupon the pistons 40 are actuated to the right (see Fig. 2) to move the disc 44 axially to engage the friction element 60 with the discs 22 and 44. Upon release of pressure on the fluid, the disc 44 is returned by the spring 48 to its normal position, and the friction element is moved away from the discs 22 and 44 due to the wiping action of this element.

When the wheel to which the friction element is attached is removed, the friction element will substantially retain its normal position, due to the engagement of its periphery with the torque taking plate 52. The amount of drop of the friction element when the wheel is removed is negligible; hence, when the wheel is remounted, the beveled ends 58 on the studs or pins 56 will readily engage the openings in the friction element.

It is to be observed that an adjustment may be easily effected by means of the self locking nut 46. This simple adjusting means requires only turning down the nuts and then releasing each of the nuts the same amount until the wheel is free to rotate. It will also be observed that there is no loss whatsoever due to deflections in the hookup, since to obtain the necessary pressure on the disc, it is only necessary to make the area of the cylinders of sufficient size to keep the line pressure within the usual working limit; for example, the individual cylinders shown in the drawing are much smaller than the cylinder of a comparable internal expanding brake, but the combined area of the three cylinders is considerably greater.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention what I claim as new and desire to secure by Letters Patent, is:

1. A brake comprising a fixed housing disc, an axially movable non-rotatable housing disc having an interlocking connection therewith, said discs having outer surfaces exposed to the surrounding air for cooling, and hydraulic means associated with the housing for actuating the axially movable disc.

2. A brake comprising a fixed housing disc, an axially movable housing disc associated therewith, said discs having outer surfaces exposed to the surrounding air for cooling, torque taking members secured to the fixed disc retaining the axially movable disc against rotation, and means for moving the axially movable disc including spaced cylinders and pistons in the cylinders connected directly to the axially movable disc.

3. A brake comprising a fixed housing disc, an axially movable housing disc, said discs having outer surfaces exposed to the surrounding air for cooling, interlocking connections between the fixed and movable discs, a rotatable and axially movable friction disc between the fixed and movable discs and means for hydraulically actuating the movable disc to engage the friction disc including a plurality of cylinders connected in series.

4. A brake comprising a fixed disc, an axially movable disc, means on the fixed disc retaining the axially movable disc against rotation, a rotatable axially movable friction disc between the fixed and movable discs and means for engaging the fixed and movable discs with the friction discs including cylinders arranged in spaced relation on the fixed disc, pistons in the cylinders connected to the movable disc, means connecting the cylinders in series, means for connecting the first cylinder in the series to fluid pressure means, and a bleeder for the last cylinder in the series.

5. A hydraulic disc brake comprising a fixed friction disc, a cylinder having an open and closed end and closed end secured to the fixed disc by its closed end, a piston therein having a stem passing through said closed end and disc, and means for admitting hydraulic fluid between said piston and closed end.

6. A hydraulic disc brake comprising a fixed friction disc, an axially movable disc spaced therefrom, a rotary friction means between said discs, a cylinder having an open and closed end, abutting said fixed disc at its closed end, a piston therein having a stem extending through said closed end and fixed disc into engagement with said axially movable disc, and resilient means on said stem between said fixed and axially movable discs.

7. In a hydraulic disc brake, a pair of spaced non-rotatable discs, a cylinder secured to one, a piston therein, a piston rod passing through one disc and secured to the other, and means for admitting fluid to said cylinder to draw said discs together.

8. A brake comprising a friction element including corresponding annular discs having alternating continuous webs pressed therein and extending from the inner peripheries to the outer peripheries of the discs, said webs being arranged on the adjacent facing surfaces of the discs.

9. A brake comprising a friction element including corresponding annular discs having alternating continuous webs pressed therein and extending from the inner peripheries to the outer peripheries of the discs, said webs being arranged on the adjacent facing surfaces of the discs, and alternating with the webs on the other disc, means for securing the discs together, and friction lining on oppositely disposed faces of the discs.

10. In a hydraulic disc brake, a pair of spaced non-rotatable discs, a cylinder for actuating said brake having means closing one end thereof and secured to the adjacent non-rotatable disc, means closing the other end thereof and having a piston rod secured thereto and passing through an aperture in the other closing means, and passing through an aperture in one of the non-rotatable discs and secured to the other, means operably connecting the other closing means to the apertured non-rotatable disc and means for admitting fluid to said cylinder to draw said discs together.

11. In a hydraulic disc brake, a pair of spaced non-rotatable discs, a rotatable disc adapted to be frictionally embraced by said non-rotatable discs, an actuating means for frictionally engaging said discs comprising a cylinder and means closing each end thereof, a piston rod secured to one closing means, passing through an aperture in the other closing means, and passing through an aperture in one of the non-rotatable discs and secured to the other, means operably connecting the other closing means to the apertured non-rotatable disc, and means for admitting fluid to said cylinder to draw said discs together.

12. In a hydraulic disc brake, a pair of spaced non-rotatable discs, a rotatable disc adapted to be frictionally embraced by said non-rotatable discs, an actuating cylinder having a piston therein and means for closing one end of said cylinder, said piston being relatively movable with respect to said closing means, and having a piston rod passing through said closing means and one of said discs and connected to the other, said closing means reacting upon the one of said discs, and fluid connections to said cylinder for admitting fluid between the closing means and the piston.

13. In a hydraulic disc brake, a pair of spaced non-rotatable discs, expansible chamber means for actuating said brake comprising a cylinder and spaced cylinder heads relatively movable with respect to each other, a rod secured to one head and passing through an aperture in the other, and through an aperture in one of the discs and secured to the other, said apertured head being operably connected to the other disc, and means for admitting fluid into said cylinder between the heads to draw the discs together.

14. In a hydraulic disc brake, a pair of spaced non-rotatable discs, a rotatable disc therebetween, expansible chamber means for actuating said brake comprising a cylinder and spaced cylinder heads relatively movable with respect to each other, a rod secured to one head and passing through an aperture in the other, and through an aperture in one of the discs and secured to the other, said other head being operably connected to the apertured disc, and means for admitting fluid into said cylinder between the heads, to draw the discs into frictional engagement with the rotatable discs.

15. A brake comprising a fixed housing disc, an axially movable housing disc having an interlocking connection therewith, said discs having outer surfaces exposed to the surrounding air for cooling and hydraulic means including a cylinder and piston arrange parallel to the axis of the brake, and means connecting the cylinder to one of the discs and the piston to the other of the discs for actuating the axially movable housing disc relative to the fixed housing disc.

LUDGER E. LA BRIE.